US010380308B2

(12) United States Patent
Correale, Jr. et al.

(10) Patent No.: US 10,380,308 B2
(45) Date of Patent: Aug. 13, 2019

(54) POWER DISTRIBUTION NETWORKS (PDNS) USING HYBRID GRID AND PILLAR ARRANGEMENTS

(71) Applicant: QUALCOMM Incorporated, San Diego, CA (US)

(72) Inventors: Anthony Correale, Jr., Raleigh, NC (US); Philip Michael Iles, Durham, NC (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 15/867,022

(22) Filed: Jan. 10, 2018

(65) Prior Publication Data
US 2019/0213298 A1 Jul. 11, 2019

(51) Int. Cl.
G06F 17/50 (2006.01)
H01L 23/00 (2006.01)
H01L 23/528 (2006.01)

(52) U.S. Cl.
CPC ...... *G06F 17/5077* (2013.01); *H01L 23/5286* (2013.01); *G06F 17/5072* (2013.01); *G06F 17/5081* (2013.01); *G06F 2217/78* (2013.01)

(58) Field of Classification Search
CPC .......... G06F 17/5077; G06F 17/5081; G06F 17/5072; G06F 2217/78; H01L 23/5286
USPC ....... 716/120, 127, 133; 703/14; 326/41, 47, 326/101
See application file for complete search history.

(56) References Cited

U.S. PATENT DOCUMENTS 5,313,079 A * 5/1994 Brasen .............. H01L 27/11807
257/206
5,343,058 A * 8/1994 Shiffer, II ......... H01L 27/11807
257/204
5,358,809 A * 10/1994 Van Berkel .......... G02F 1/1362
430/312

(Continued)

FOREIGN PATENT DOCUMENTS

| EP | 1176640 A2 | 1/2002 |
|---|---|---|
| EP | 3229270 A1 | 10/2017 |
| WO | 2007070879 A1 | 6/2007 |

OTHER PUBLICATIONS

Savidis, "Chacterization and Modeling of TSV Based 3-D Integrated Circuits", University of Rochester, Rochester, New York, 2013, 443 pages. (Year: 2013).*

(Continued)

*Primary Examiner* — Phallaka Kik
(74) *Attorney, Agent, or Firm* — W&T/Qualcomm (57) ABSTRACT

Power distribution networks (PDNs) using hybrid grid and pillar arrangements are disclosed. In particular, a process for designing an integrated circuit (IC) considers various design criteria when placing and routing the PDN for the IC. Exemplary design criteria include switching frequencies, current densities, and decoupling capacitance and their impact on temperature. In areas of high localized temperature, a power grid structure is used. In other areas, shared metal track pillars may be used. By mixing power grids with pillars, the IC may reduce local hotspots by allowing the grid to help dissipate heat and assist with decoupling capacitance while at the same time providing pillars in areas of high current density to reduce resistive losses.

27 Claims, 9 Drawing Sheets

(56) References Cited

U.S. PATENT DOCUMENTS

| | | | |
|---|---|---|---|
| 6,160,705 A * | 12/2000 | Stearns | H01L 23/49816 361/704 |
| 6,424,022 B1 * | 7/2002 | Wu | H01L 23/552 257/547 |
| 8,336,018 B2 | 12/2012 | Turner et al. | |
| 8,410,579 B2 | 4/2013 | Ghia et al. | |
| 8,445,918 B2 | 5/2013 | Bartley et al. | |
| 9,397,073 B1 | 7/2016 | England | |
| 9,570,395 B1 * | 2/2017 | Sengupta | H01L 23/5286 |
| 10,311,945 B2 * | 6/2019 | Masuoka | G11C 11/418 |
| 2004/0051174 A1 * | 3/2004 | Steinecke | H01L 23/5222 257/739 |
| 2005/0111250 A1 * | 5/2005 | Balasuramanian | G11C 17/12 365/148 |
| 2006/0095872 A1 | 5/2006 | McElvain et al. | |
| 2010/0001379 A1 | 1/2010 | Lee et al. | |
| 2010/0029045 A1 * | 2/2010 | Ramanathan | H01L 21/565 438/114 |
| 2014/0140121 A1 * | 5/2014 | Clinton | G11C 17/08 365/104 |
| 2016/0042783 A1 * | 2/2016 | Masuoka | H01L 27/092 365/154 |
| 2016/0126180 A1 | 5/2016 | Meng et al. | |
| 2017/0025185 A1 * | 1/2017 | Rawat | G11C 17/10 |
| 2017/0147727 A1 | 5/2017 | Bickford et al. | |
| 2018/0166568 A1 * | 6/2018 | Samra | H01L 23/5226 |

OTHER PUBLICATIONS

Xu, "Modeling and Design Techniques for 3-D ICs under Process, Voltage, and Temperature Variations", Ecole Polytechnique Federale de Lausanne, Nov. 21, 2012, 228 pages. (Year: 2012).*

International Search Report and Written Opinion for PCT/US2018/064667, dated Mar. 14, 2019, 16 pages.

* cited by examiner

POWER DISTRIBUTION NETWORKS (PDNS) USING HYBRID GRID AND PILLAR ARRANGEMENTS

BACKGROUND

I. Field of the Disclosure

The technology of the disclosure relates generally to improving power distribution networks (PDNs) in integrated circuits (ICs).

II. Background

Computing devices have become increasingly common in modern society. Early computers were the size of a room and employed vacuum tubes to provide rudimentary mathematical calculations. In contrast, modern computing devices provide myriad multimedia, telephony, word processing, and other functions in a relatively small package relying on integrated circuits (ICs). The industry feels market pressure to provide ever increasing processing options in increasingly small products. While ICs have generally obeyed Moore's Law, continued advances in IC functionality in a smaller package is stressing manufacturing capabilities.

Current IC manufacturing processes rely on sequences of masks used in stages to create multi-level ICs, such as an active layer that may include one or more transistors with multiple layers of metal positioned thereover to provide interconnections between different transistors and provide connections to exterior pins. Vias (while vias is a word in and of itself that describes the structure, some people consider vias an acronym for vertical interconnect access) or other vertical elements allow interconnections between layers. As the complexity of the IC increases, the mask count to make the IC also increases. It is common to refer to the size of a channel between a source and a drain of a transistor as a process node size. Early ICs had process node sizes in the micrometer range. Current ICs are in the nanometer range with current designs calling for sub-ten nanometer process node sizes.

This decrease in the node size has caused older planar Field Effect Transistors (FETs) to suffer from short channel effects (SCEs) which degrade performance. Accordingly, the industry shifted from the older planar FETs to FETs with fins (i.e., finFETs) that allowed a gate to wrap around the fin and mitigate the SCEs. With today's advanced finFET technologies, very high current densities can occur in large devices (i.e., devices with large fin counts) and may also occur in groups of many devices with high switching activity within a relatively small area within an IC. These high current densities can result in high local junction temperatures compared to the overall temperature within the IC. Current modeling techniques do not always correctly model such localized hotspots or do not properly account for such localized hotspots.

Concurrently as device density increases and the need for more power and ground connections increases, power distribution has encountered additional difficulties. The historic technique to deliver power was through a power grid that used multiple layers of metal within the IC to distribute power. However, such power grids have also been impacted as the physical size of the metal traces in the metal layers has been reduced. Specifically, as the physical size of the conductive material diminishes, the resistance of the conductive material increases. To minimize the resistance and the corresponding voltage drop in the power distribution network (PDN), the traditional grid has been replaced with shared metal track pillars. Portions of the grid may remain at high metal layers, but the metal layers closest to the active elements use the shared metal track pillars.

These shared metal track pillars are essentially stacks of vias with one via on each metal layer. The stack traverses many metal layers until a full power grid can be reached at a relatively high metal layer. While this pillar approach frees up or makes available more wiring tracks for signals and reduces the current*resistance (i.e., IR) loss due to the increased amount of power vias per power unit area, this approach comes at the expense of local thermal heating, which in turn, affects performance and product longevity. That is, local heating can affect device life and cause reductions in device current.

Further complicating matters, the decoupling capacitance associated with cell adjacency which shares a grid-based power distribution at the lower metal layers (i.e., those closest to the silicon surface) is severely compromised with the pillar approach. Thus, switching activity in one cell row is isolated from another cell row until the grid is reached. The grid may be six-to-eight (6-8) levels of metal up the stack. This isolation limits the noise to be curtailed if the active switching in one row no longer takes advantage of a quiet neighbor or a neighbor whose switching occurs in a different time period.

Accordingly, there is a need for an improved PDN in small node size ICs which has the advantages of the shared metal track pillar while avoiding the localized temperature penalties that the shared metal track pillars impose.

SUMMARY OF THE DISCLOSURE

Aspects disclosed in the detailed description include power distribution networks (PDNs) using hybrid grid and pillar arrangements. In particular, a process for designing an integrated circuit (IC) considers various design criteria when placing and routing the PDN for the IC. Exemplary design criteria include switching frequencies, current densities, and decoupling capacitance and their impact on temperature. In areas of high localized temperature, a power grid structure is used. In other areas, shared metal track pillars may be used. By mixing power grids with pillars, the IC may reduce local hotspots by allowing the grid to help dissipate heat and assist with decoupling capacitance while at the same time providing pillars in areas of high current density to reduce resistive losses.

In this regard in one aspect, an IC is disclosed. The IC includes a substrate having an active layer thereon. The IC also includes a plurality of metal layers positioned above the active layer. The IC also includes a PDN. The PDN includes a plurality of pillars extending through at least four metal layers positioned closest to the active layer. The PDN also includes a grid formed from metal traces within the at least four metal layers positioned closest to the active layer, the grid interconnecting at least a subset of the plurality of pillars.

In another aspect, a method to design an IC is disclosed. The method includes analyzing an initial placement of active elements in an IC design where the initial placement includes an initial PDN based on one or more initial criteria. The method also includes determining current densities for regions of the initial placement with the initial PDN. The method also includes ranking the regions based on the current densities and one or more additional criteria. The method also includes, for a first region, identifying a neighbor region. The method also includes inserting one or more grid structures in the initial PDN, where the one or more grid structures are positioned in a metal layer proximate an active layer within the first region and extending into the neighbor region to alleviate thermal activity in the first region.

In another aspect, a non-transitory computer-readable medium is disclosed. The non-transitory computer-readable medium has computer executable instructions stored thereon which, when executed by a processor, cause the processor to analyze an initial placement of active elements in an IC design where the initial placement includes an initial PDN based on one or more initial criteria. The instructions also cause the processor to determine current densities for regions of the initial placement with the initial PDN. The instructions also cause the processor to rank the regions based on the current densities and one or more additional criteria. The instructions also cause the processor to, for a first region, identify a neighbor region. The instructions also cause the processor to insert one or more grid structures in the initial PDN, where the one or more grid structures are positioned in a metal layer proximate an active layer within the first region and extending into the neighbor region to alleviate thermal activity in the first region.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include power distribution networks (PDNs) using hybrid grid and pillar arrangements. In particular, a process for designing an integrated circuit (IC) considers various design criteria when placing and routing the PDN for the IC. Exemplary design criteria include switching frequencies, current densities, and decoupling capacitance and their impact on temperature. In areas of high localized temperature, a power grid structure is used. In other areas, shared metal track pillars may be used. By mixing power grids with pillars, the IC may reduce local hotspots by allowing the grid to help dissipate heat and assist with decoupling capacitance while at the same time providing pillars in areas of high current density to reduce resistive losses.

Figure 1A:
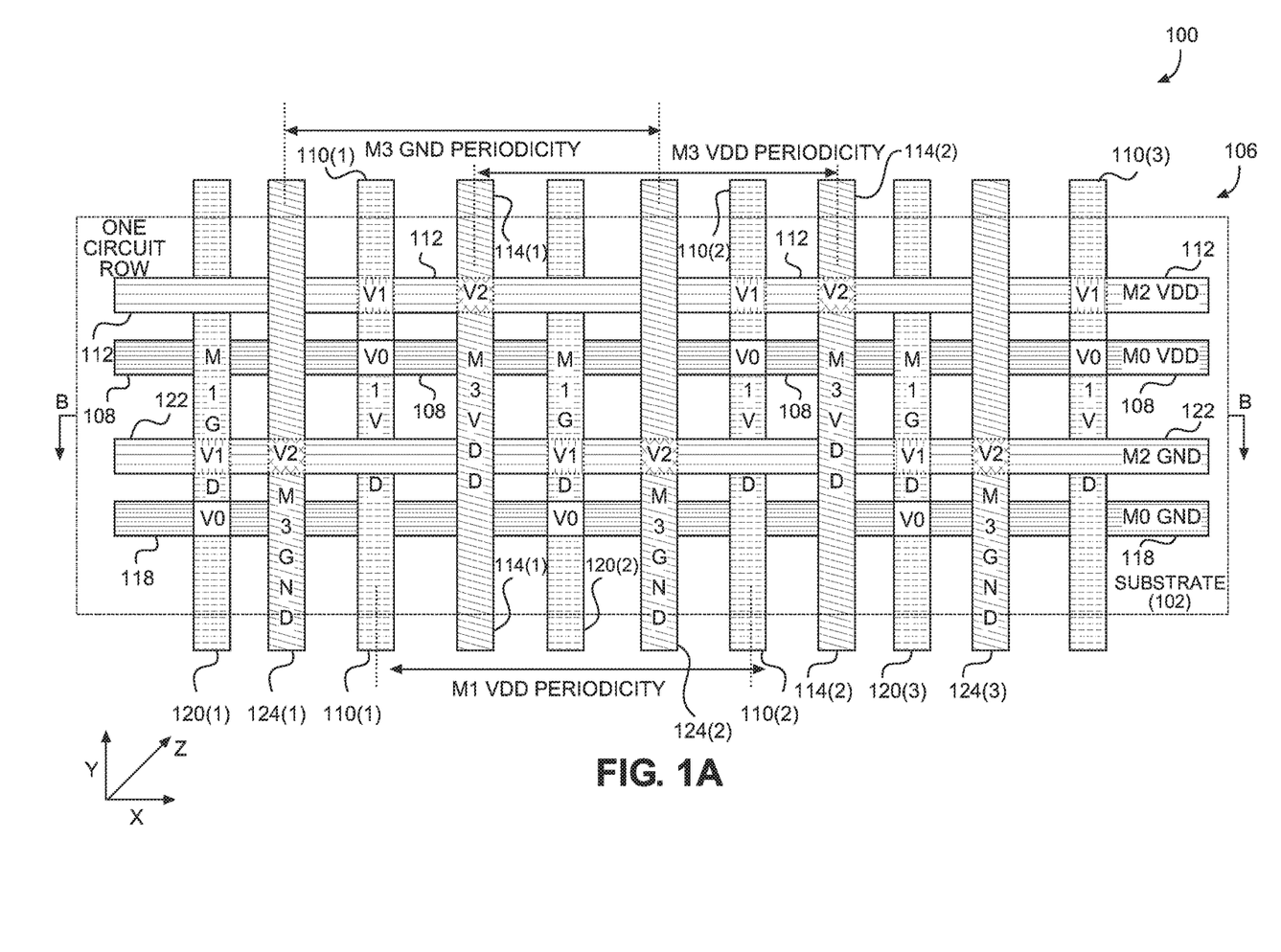
FIG. 1A is a simplified top plan view diagram of an exemplary power distribution network (PDN) using a grid structure in low metal layers with the metal layers offset from one another to assist.
Figure 1B:
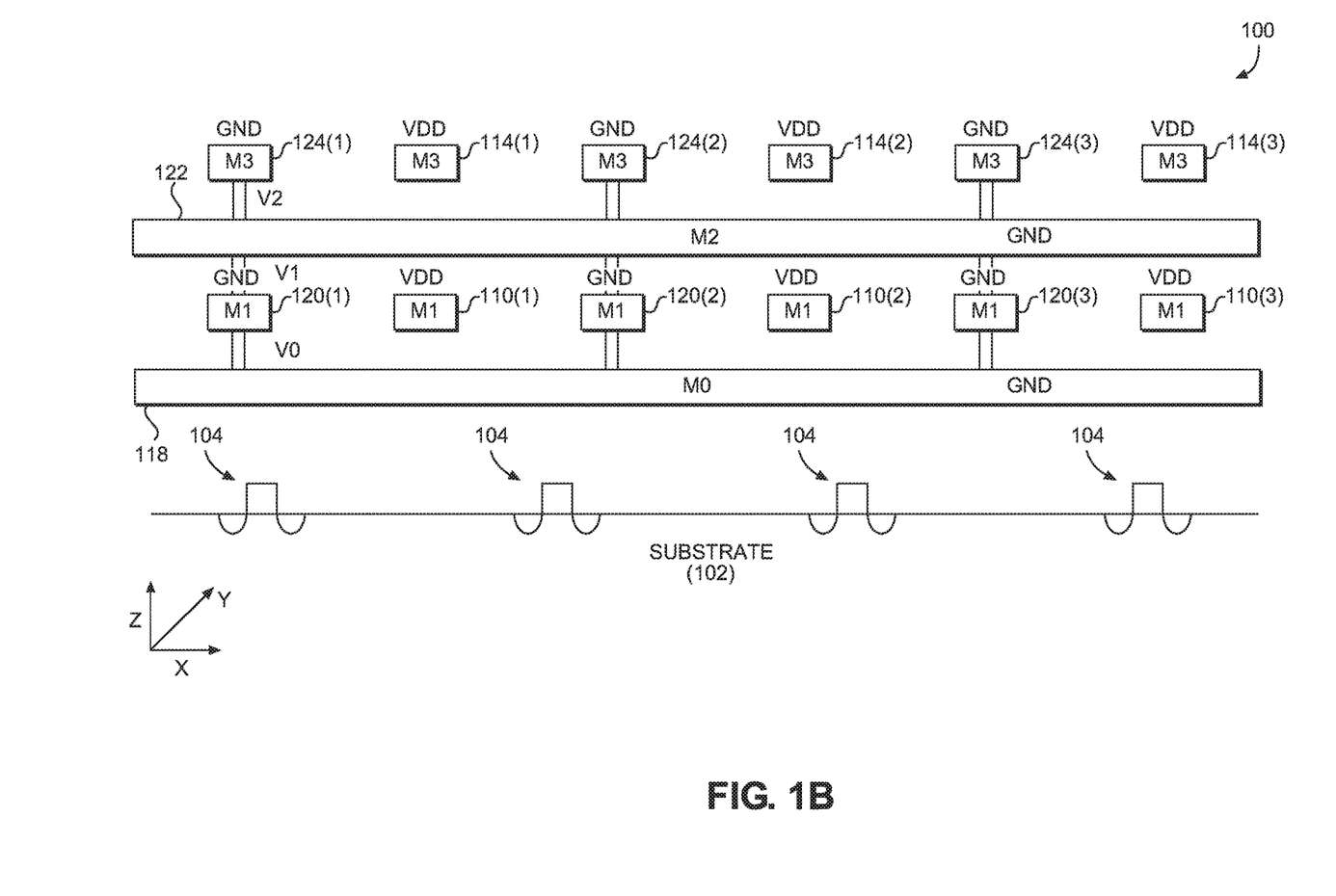
FIG. 1B is a side cross-sectional view of FIG. 1A taken along line B-B with the metal layers not offset.

Before addressing exemplary aspects of the present disclosure, a brief overview of grid PDNs is provided with reference to FIGS. 1A and 1B and an overview of a pillar-based PDN is provided with reference to FIGS. 2A-2D and FIG. 3. A discussion of exemplary aspects of the present disclosure begins below with reference to FIG. 4.

In this regard, FIG. 1A is top plan view of a classical "uniform" grid-based PDN within an IC 100. FIG. 1B shows a side cross-sectional view of the IC 100 taken along line B-B of FIG. 1A. The IC 100 has a substrate 102 on which active elements 104 are formed (FIG. 1B) such as Field Effect Transistors (FETs), which may be fin-based FETs (finFETs), or the like. A plurality of metal layers M0-M3 is positioned above the substrate 102. The lowest metal layer is M0, and runs in the x-axis direction. M0 is the base level included in a standard cell of an IC, such as the IC 100. The next level up in the z-axis direction is M1, which runs in the y-axis direction. The next level up in the z-axis direction is M2, which runs in the x-axis direction. The next level up in the z-axis direction is M3, which runs in the y-axis direction. It should be appreciated that most ICs, including an IC such as the IC 100 may have up to fifteen (15) metal layers (M0-M14), although only M0-M3 are shown in FIGS. 1A and 1B. Note further that some industry literature refers to the lowest metal layer as M1 instead of M0. However, even that literature adheres to the convention that the lowest metal layer has the lowest number and the metal layers that are further away from the substrate in the z-axis direction have higher numbers.

For the purposes of illustration, each of the metal layers running in the x-axis direction and each of the metal layers running in the y-axis direction are shown offset from one another in FIG. 1A. FIG. 1B shows the metal layers in proper position with direct overlap. Further, while each of the metal traces is shown as having the same width, each may be specified differently.

With continued reference to FIGS. 1A and 1B, the metal layers form a PDN 106, where VDD is supplied by metal trace 108 in metal layer M0, metal traces 110(1)-110(3) in metal layer M1, metal trace 112 in metal layer M2, and metal traces 114(1)-114(2) in metal layer M3. It should be appreciated that as the area of the IC 100 increases, additional metal traces 108(N), 110(M), 112(N), and 114(M) would be present (none shown), but reoccurring according to the VDD periodicity defined by the PDN 106.

Similarly, a ground (GND) is supplied by metal trace 118 in metal layer M0, metal traces 120(1)-120(3) in metal layer M1, metal trace 122 in metal layer M2, and metal traces 124(1)-124(3) in metal layer M3. Again, it should be appreciated that as the area of the IC 100 increases, additional metal traces 118(N), 120(M), 122(N), and 124(M) would be present (none shown), but reoccurring according to the GND periodicity defined by the PDN 106. The periodicity of GND and VDD on each level is defined to ensure that the IR drop (voltage drop) and the electro-migration (EM) is within design specifications. Note that while illustrated as having uniform periodicity, the periodicity may vary between GND and VDD and may further vary based on the metal layer (e.g., M0 may have a different periodicity than M2).

With continued reference to FIGS. 1A and 1B, vertical interconnections are formed by vias. In particular, V0 vias connect M0 to M1, V1 vias connect M1 to M2, V2 vias connect M2 to M3, and so on.

Figure 2A:
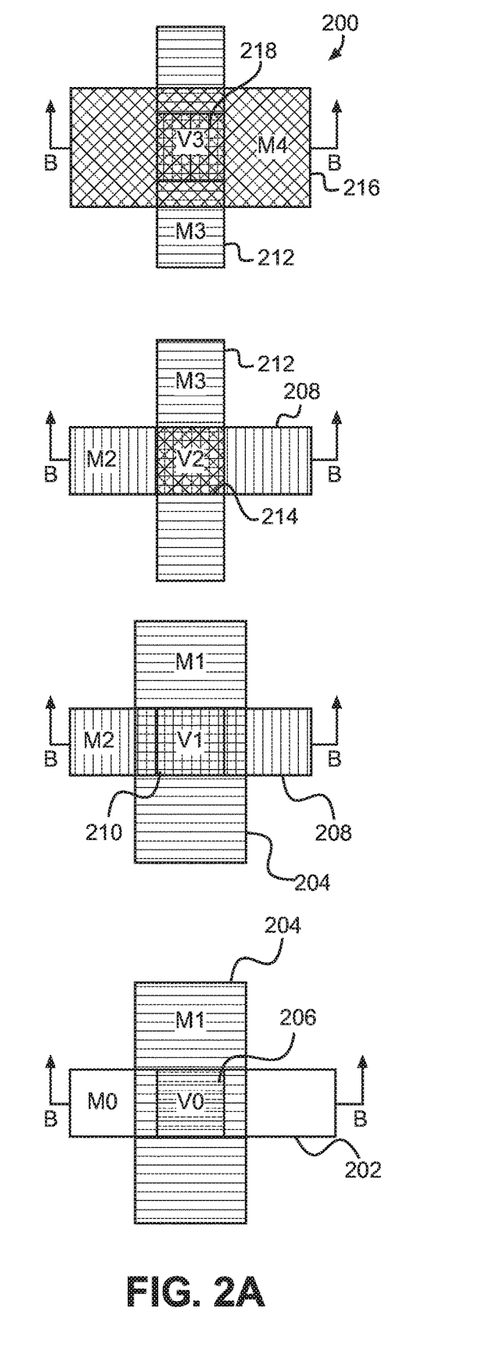
FIG. 2A is a simplified top plan view of various metal layers with vias interconnecting them that form various layers of a shared metal track pillar.
Figure 2B:
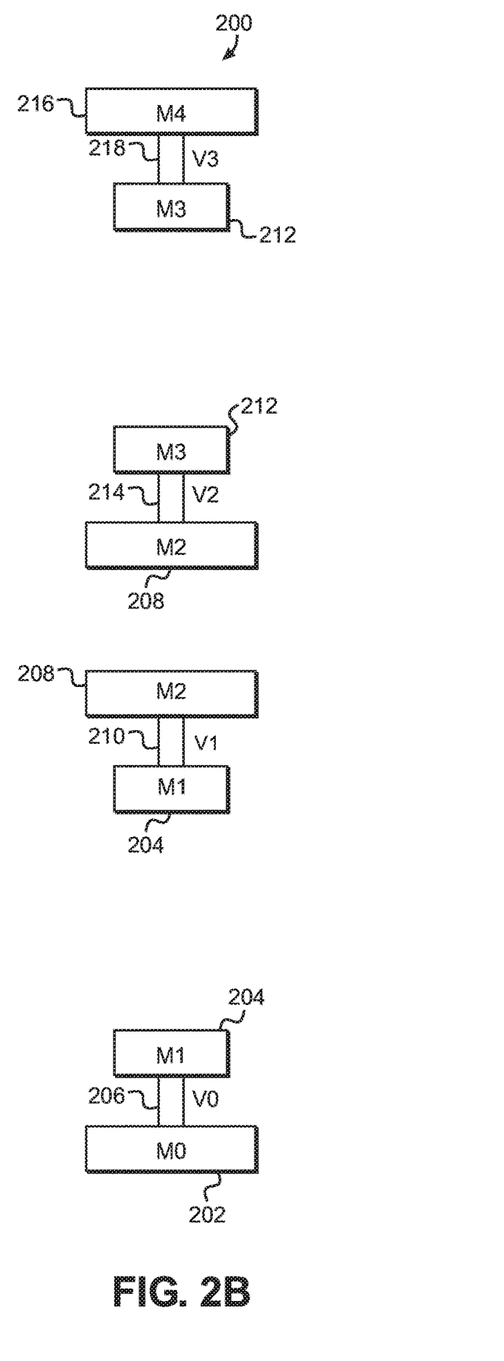
FIG. 2B is a cross-sectional view of the various metal layers of FIG. 2A taken along line B-B.
Figure 2C:
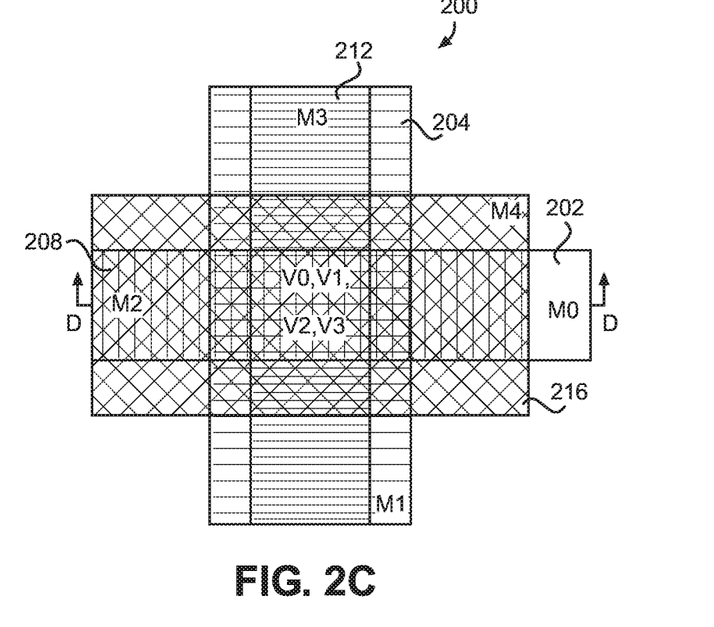
FIG. 2C is a top plan view of the various views of FIG. 2A consolidated into a single shared metal track pillar.
Figure 2D:
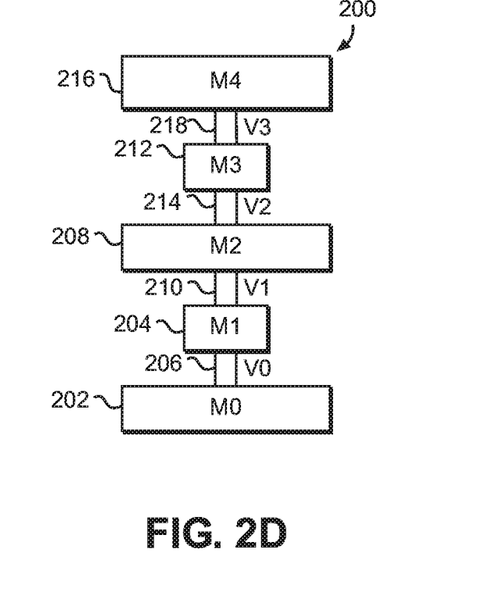
FIG. 2D is a cross-sectional view of the shared metal track pillar of FIG. 2C taken along line D-D.

In contrast to the grid approach of FIGS. 1A and 1B, FIGS. 2A-2D illustrate a traditional shared metal pillar approach to a PDN. In particular, FIGS. 2A and 2B show individual pairs of layers for a pillar 200 with FIG. 2A showing a top plan view and FIG. 2B showing a cross-sectional view taken along line B-B. FIGS. 2C and 2D show the entire pillar 200 with FIG. 2C showing a top plan view and FIG. 2D showing a cross-sectional view taken along line D-D. For the purposes of illustration, only four levels of metal are illustrated. It should be appreciated that the pillar 200 may extend into higher levels such as M6 or M8, and even in some situations M14.

In particular, FIGS. 2A and 2B illustrate a first metal segment 202 in the M0 metal layer coupled to a second metal segment 204 in the M1 metal layer by a V0 via 206. Likewise, the second metal segment 204 is coupled to a third metal segment 208 in the M2 layer by a V1 via 210. The third metal segment 208 is coupled to a fourth metal segment 212 in the M3 layer by a V2 via 214. The fourth metal segment 212 is coupled to a fifth metal segment 216 in the M4 layer by a V3 via 218. The entirety of the pillar 200 is illustrated in FIGS. 2C and 2D. In general, each of the metal segments 202, 204, 208, 212, and 216 at each of the vias 206, 210, 214, and 218 is some minimum area defined by the technology manufacturer. In some cases, if the technology supports a "cut" metal mask/feature, then a given metal segment may be cut to satisfy the area and enclosure of the pillar 200.

Figure 3:
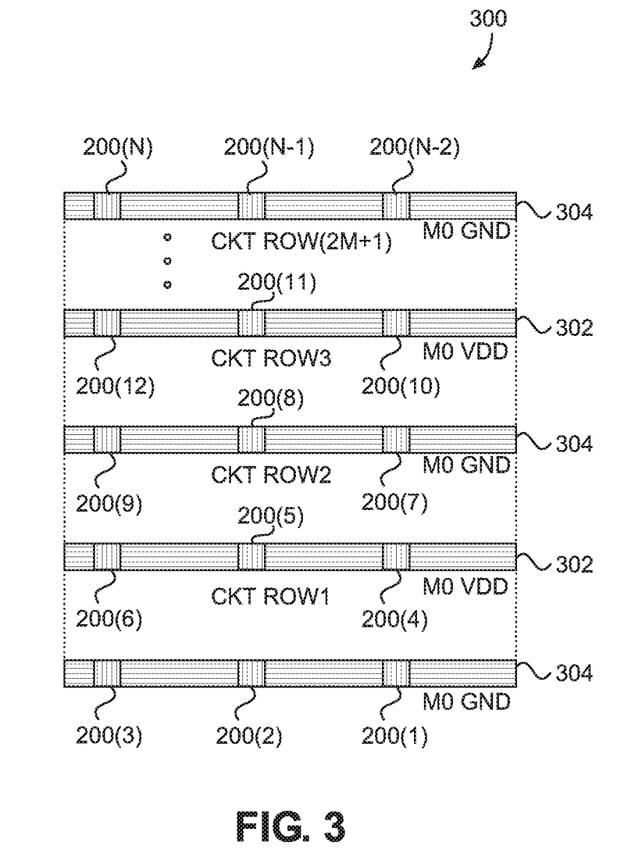
FIG. 3 is a top plan view of a simplified illustration of pillar placement in an integrated circuit (IC) according to conventional pillar power placement techniques.

FIG. 3 illustrates an IC 300 with multiple pillars 200(1)-200(N) on both power rails 302 and ground rails 304 across multiple cell placement rows. As illustrated, there are an odd number of rows, with cells for each row. The pillars 200(1)-200(N) are aligned in a common vertical metal wiring channel or track. This arrangement allows a higher via density than is available using a grid-based PDN as in the IC 100 of FIG. 1A. The higher via density results in lower IR losses as the resistance contributed to the PDN from the vias is reduced. Note that there may be a grid at some higher metal layer(s) such as M6 or higher that connects the pillars 200(1)-200(N) together (allowing for different traces for VDD and GND).

It should be appreciated that each of the PDNs illustrated in FIGS. 1A-2D has its advantages and disadvantages. The power grid of the IC 100 allows efficient heat distribution, decoupling capacitance, and noise mitigation, but at the expense of comparatively higher IR drops if the periodicity of the power grid does not match that of the pillar PDN for each power and ground. Conversely the pillar 200 has comparatively lower IR drops, but concentrates heat because there is greater thermal resistance as the distance from the substrate to the gridded plane is larger. This greater thermal resistance results in a higher local junction temperature, which may have end-of-life ramifications and/or degrade local performance as the increased trapped heat affects electron mobility in the substrate. In addition to the thermal characteristics of the pillars 200(1)-200(N), the pillars 200(1)-200(N) also sacrifice a natural decoupling of switching events across circuit rows. An example switching event might be a switching event that takes place in a first row (e.g., CKT row 1) of an IC. Since there are no gridded power planes shared across all the circuit rows in the IC 300 of FIG. 3 until M4 or higher, the quiet domains of another row that is not going through a switching event (e.g., a third row, CKT row 3) are not effectively used to help quiet the noise of the switching event in the first row. Thus, not only are there higher local junction temperatures, but also there are larger noise spikes which can degrade performance, induce more unwanted coupling and increase the effective IR drop as the alternating current (AC) portion of the switching event is integrated with the direct current (DC) portion.

Exemplary aspects of the present disclosure form a hybrid grid and pillar PDN with grid elements positioned in the low metal layers to assist in thermal dissipation and decoupling, while preserving the advantages of the pillars with respect to voltage drops. In particular, exemplary aspects of the present disclosure contemplate designing a circuit that includes pillars for primary power distribution to areas where high current densities are needed coupled with partial grids to assist in thermal dissipation and decoupling.

Figure 4:
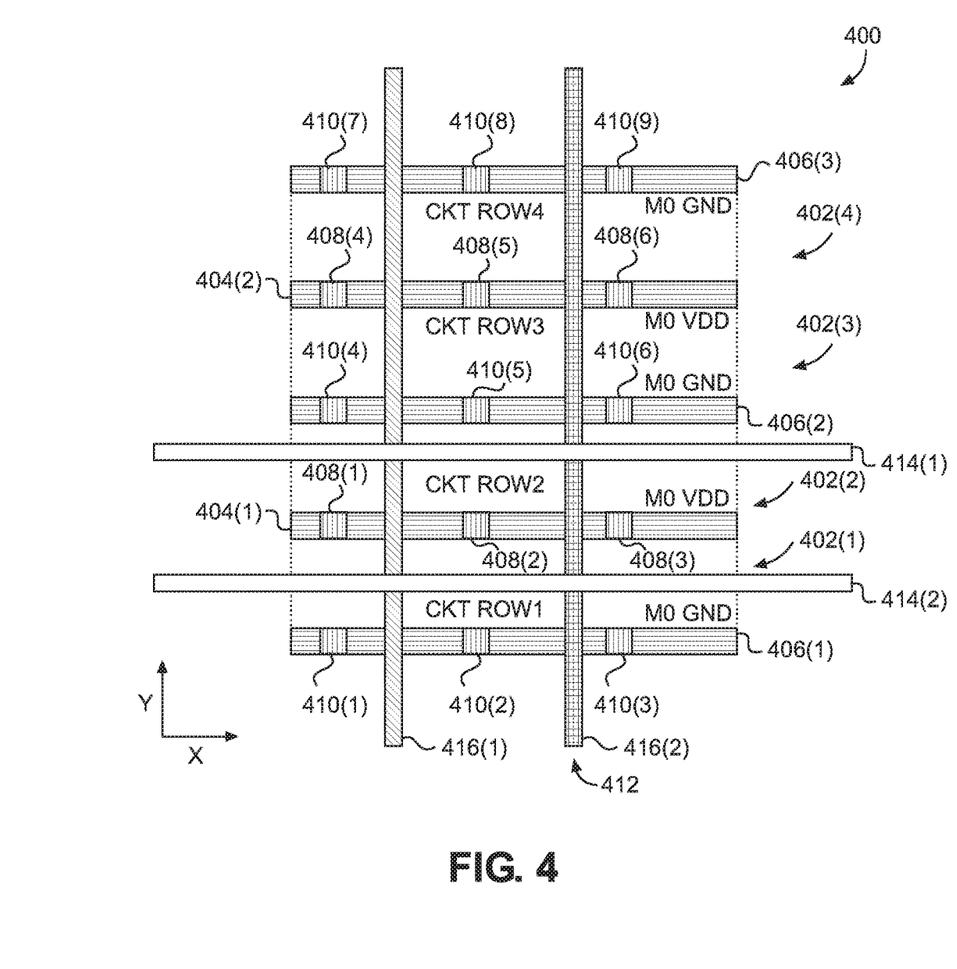
FIG. 4 is a top plan view of a simplified illustration of a hybrid grid-pillar PDN according to an exemplary aspect of the present disclosure.

In this regard, FIG. 4 illustrates a top plan view of an IC 400 having four circuit cell rows 402(1)-402(4). The IC 400 includes M0 VDD power lines 404(1) and 404(2) and M0 GND power lines 406(1)-406(3). The M0 VDD power lines 404(1) and 404(2) include VDD pillars 408(1)-408(6) that are similar to the pillars 200(1)-200(N) described above. Further, the IC 400 includes GND pillars 410(1)-410(9) that are similar to the pillars 200(1)-200(N) described above. In addition to the pillars 408(1)-408(6) and 410(1)-410(9), the IC 400 includes a grid 412 interleaved over regions where high current switching or other activity that contributes to a high localized junction temperature occurs. The grid 412 includes M2 metal traces 414(1)-414(2) and M1 metal traces 416(1)-416(2). While not illustrated, the grid 412 may further include M3 metal traces above the M2 metal traces 414(1)-414(2) and parallel to (i.e., extending along the y-axis) the M1 metal traces 416(1)-416(2). Likewise, while not illustrated, the grid 412 may further include M4 metal traces above the M3 metal traces and parallel to (i.e., extending along the x-axis) the M2 metal traces 414(1)-414(2). Vias (not shown) may interconnect the metal traces of the grid 412.

Figure 5:
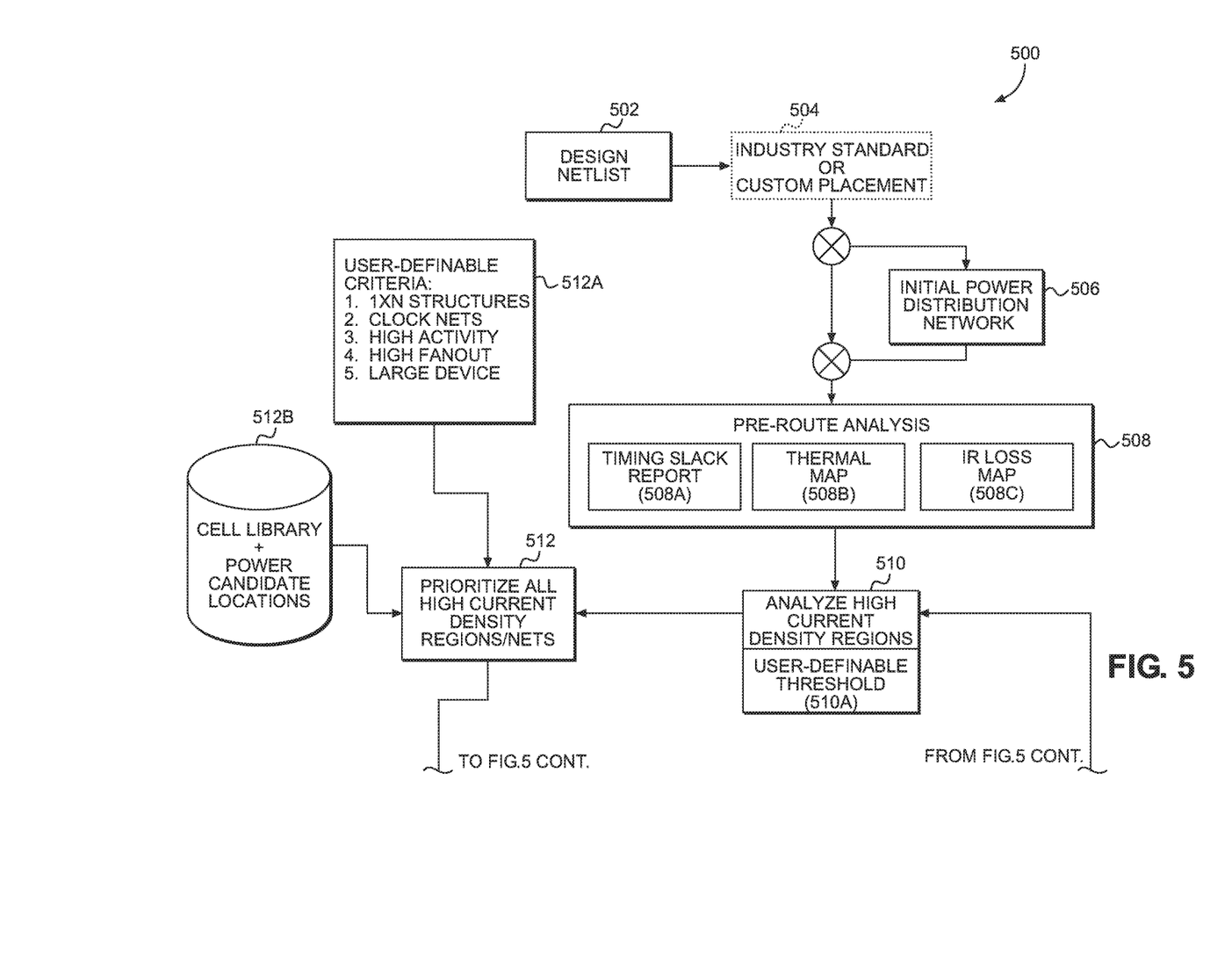
FIG. 5 is a flowchart illustrating an exemplary process for creating a hybrid pillar and grid power distribution network according to an exemplary aspect of the present disclosure.

In addition to the IC 400 having a hybrid grid and pillar PDN, exemplary aspects of the present disclosure also provide a process 500, illustrated in FIG. 5 that identifies high switching nets (e.g., clocks, outputs, or the like) with some user-defined fin count and allocates the power distribution to be grid based up to some user-defined threshold and over some cell row placements to aid in noise decoupling. The grid-based structure need not cover the entire IC or region of interest within the IC, but should extend from a first region having a first characteristic that is impacted by or impacts a local junction temperature to a second region having a second characteristic, different from the first characteristic. Exemplary characteristics include, but are not limited to: current density, switching frequency, timing slack, or the like. The process 500 will also interleave, on some user-defined periodicity, power pillars in regions not requiring grid-based implementations. The process 500 will also locate partially used wiring tracks which can be used with power pillars to further bolster or enhance the existing power pillar distribution. The process 500 uses a cell library to assist in the creation of the PDN. The cell library may have components which may have representations of device size and physical device locations to aid in calculation. Alternatively, just the layout files may be used. The cell library may include user definitions or thresholds and may include preferred locations for grid-based tracks. The process 500 may then utilize timing slack, power distribution voltage drops (i.e., IR loss), or representations of regions of high switching activity and other inputs as placement and routing decisions are made.

The process 500 uses a "netlist" that contains all the various circuits that are used in the design and all needed interconnections. Within the netlist are various high drive strength circuits as well as circuits having high frequency switching such as clocks, latches, and drivers. The netlist may reference a cell library, which is a repository of symbols, schematics, abstracts, and physical layouts corresponding to the circuits in the netlist as well as other circuit design tools which may or may not have been used in a given circuit's design. The cell library may also have various representations identifying pin connections and power ports and may also include some physical locations for preferred power targets, such as grid-based locations, which the process 500 may use. The process 500 may use a software-based placement too to create a placement consistent with an optimized routing and/or timing. Early timing assessments may be done with the present process 500 using this initial placement tool with or without formal routing. In an exemplary aspect, wiring length estimates using Steiner distances can be employed to assess areas of timing concern. In another aspect, formal routing can be employed to get a more precise assessment of timing and routing congestion.

As noted above, pillar-based power distribution can free up more levels of metal tracks (M1-M5) to aid in wiring, but at the expense of local thermal heating and reduced decoupling. Part of the process 500 is a timing analysis that will generate a "slack report." As used herein, a slack report is a report of each of the various nets of the design's amount of positive or negative margin (or slack) relative to the specification. The nets having negative slack may dictate the composite performance of the design as a whole. If those nets are also associated with proximity to high switching or high power/drive strength circuits, then the slack may be worse than what is originally reported or modeled. The difference between initial projections and the more negative reality may be a function of a high local junction temperature. In particular, the local junction temperature may be higher than is modeled using uniform junction temperatures that are generally assumed by most modeling software. By recognizing the placement of the nets and proximity to areas of high switching and/or high power/drive strength circuits, the process 500 works to modify or create a hybrid power distribution using both pillars and grid-based structures to alleviate the local thermal hot spots while preserving (and potentially enhancing) the IR drop of the PDN. The process 500 may use a thermal junction temperature map tool if such tool is available.

In this regard, FIG. 5 illustrates the process 500. In particular, the process 500 is a closed-loop algorithm that may be implemented in software to improve circuit design by opportunistically inserting hybridized pillar/grid elements into a PDN. The process 500 begins with a design netlist (block 502). The design netlist, as explained above, describes the logic cells and nets (interconnections) of a given design. This design netlist may be placed into a circuit layout by any combination of industry standard placement tools and/or a custom placement tool (block 504). This initial placement may contain an initial PDN formed from any combination of power grids and pillars. Note that block 506 is optional. If no initial PDN exists in block 504, the process 500 may create an initial PDN (block 506). The PDN is crafted with a set of metal and via structures to afford a given IR drop to the circuits. The IR drop is a function of the resistance from one destination to another and the current flowing along said path. These destinations are typically from a power or ground source to the destination circuit. The PDN is also designed to comply with the electro-migration (EM) limits of the application. EM is a life expectancy issue associated with metal fatigue and voiding (both of which may lead to failure). EM is dependent on junction temperature and power-on hours. Given current design philosophy, it is assumed that this initial PDN is primarily pillar based.

With continued reference to FIG. 5, once there is an initial PDN, the process 500 performs a pre-route analysis of the placements in the design before signal routing is complete (block 508). In particular, this pre-route analysis may generate the timing slack report (508A) discussed above, the thermal map (508B) which may be generated by the process 500 or through an external tool, and an IR loss map (508C). Once this analysis is complete, the process 500 analyzes the design for high current density regions (block 510) as defined by a user-defined threshold (block 510A). The user-defined threshold may be so defined by one or more of: minimum static or minimum dynamic current, minimum device size, minimum activity factor, or the like. Note also that things like EM and life expectancy of the part may be considered. For example, what may be considered a high current for a circuit with a ten year expected life usage might be different than what is a high current for a circuit that is only intended to be used for three years. The process 500 then prioritizes all high current density regions or nets (block 512). That is, the regions (and/or nets) identified in block 510 are ranked according to importance using user-defined criteria (block 512A). Exemplary criteria include, but are not limited to: the presence of 1×N structures, clock nets, high activity regions, high fanout regions, and/or large device structures. In addition to the user-defined criteria of block 512A, a cell library 512B may be consulted to determine power candidate locations as well as locations suited for enhanced distribution based on predicted usage (e.g., high frequency or high fanout use) and placement. Note that the user-defined criteria in block 512A may take different forms and different lists of criteria may be more or less appropriate for different designs. The output of block 512 provides a sorted list of regions under which the PDN is modified.

With reference to FIG. 5 continued, the process 500 continues by evaluating whether maximum metal usage is greater than a threshold (block 514) for the design. The threshold may be user defined for pre-route iterations and post-route iterations (block 514A). If the answer to block 514 is no, the metal usage is still below a threshold, the metal usage is considered to see if more improvements will be allowed by the process 500. That is, if a maximum metal usage has not been reached, the process continues by taking the highest ranking region on the list generated in block 512 (block 516). The first time through, block 516 takes the highest ranked region, and subsequently takes the next highest ranked region. The process looks at the regions and cells surrounding the region of interest to locate the nearest quiet neighbors (block 518). A quiet neighbor is defined to be one that has no current density or switching activity when the region of interest is active or at least less than eighty percent that of the region of interest. The evaluation of "quiet" may look at multiple layers of metal in the neighbors to see if there is a high-speed bus that passes through the region but is not used by the region or any other activity which impacts the designation as a quiet neighbor. There may be a user-defined distance to look for quiet neighbors (block 518A). The process looks at the region of interest and the quiet neighbor (and any intervening space if present) and considers if one or more pillars in that space may be converted to a pseudo-grid without negatively impacting the IR drop (block 520). One example is where pillars exist over a clock region of a 1×N structure of storage elements where an optimum PDN would be two stripes of each power and ground. While what the optimum modification should be will vary from case to case, in this example, a one for one substitution of power and ground stripes for a pillar pair results in the same number of vias, and thus a comparable IR loss. However, the addition of the stripes allows potential access to a quiet region while mitigating the higher local junction temperature. A general rule of thumb for the optimization is seeing if the number of vias can be preserved while providing the grid to spread heat and noise. In such a case, the existing pillars would be converted to one net and an additional stripe would be added for the other. This pseudo-grid would then be extended by a user-defined distance into the quiet neighbor.

The process 500 continues by identifying where pseudo-grid insertion could be done and compares the results with the default pillar arrangement to see if the insertion would benefit the circuits affected. Where the comparison is favorable, the process 500 inserts pseudo-grids (block 522). Insertion would be done at the lowest metal level possible (e.g., M0) and working up the metal stack. Maximum impact is achieved by providing interconnections in the grid in consecutive metal layers from bottom to top.

The process 500 continues by inserting pillars connecting overlapping grids or pseudo-grids (block 524) in any regions where pillars can be inserted to provide increased coupling among adjacent metals of the PDN. Note that these grid structures are proximate the active elements in the region. As used herein, proximate the active elements means within the first four or five metal layers (e.g., M0-M4). That is, if there are overlapping grids that are not interconnected, but could be with a pillar, then a pillar is so inserted to make the interconnection. The process 500 loops through blocks 514, 516, 518, 520, 522, and 524 (collectively referred to herein as the conversion loop) iterating through the regions from block 512 in the order in which they were ranked until the maximum metal use exceeds the predefined threshold in block 514.

Once the maximum metal use exceeds the threshold in block 514 (or if there are no more regions of interest from the list of block 512), the process 500 provides a report of PDN improvements (block 526). This may be output in a format able to be consumed by a human (on a display, through a paper printout, or the like).

The process 500 continues with a determination of whether the process has completed a post-route design evaluation and optimization (block 528). If the post-route design evaluation and optimization has not been done, then the design is fully routed (block 530) to connect all signal routing. This routing may be done through an industry standard tool, a custom tool, manual routing, or some combination of these. After the signal routing is complete, a post-route analysis is performed (block 532). As with the pre-route analysis (block 508), this post-route analysis may generate the timing slack report (532A) discussed above, the thermal map (532B) which may be generated by the process or through an external tool, and an IR loss map (532C). The process 500 then uses the post-route analysis report in block 510 to analyze high current density regions and continues through block 512 discussed above performing the same sort of prioritization, but on the post-route design. The process 500 then iterates through the conversion loop until a maximum metal usage threshold is exceeded (or all regions of interest are analyzed). Note that when inserting pseudo-grids in the post-route analysis, some of the changes made in the pre-route portion may be removed, reworked, or otherwise modified to comply with the signal routing or otherwise optimize regions in view of the routing. When block 514 is answered yes, a second report is generated at block 526 and the process returns to the determination of whether a post-route design has been completed at block 528. In this instance, the post-route design has been completed, and a final Graphics Design System/Specification (GDS) is generated (block 534) and the process 500 ends.

It should be appreciated that the pre-route analysis in block 508 and the post-route analysis in block 532 contain very similar data, albeit at different points of the design process (pre-routing versus post-routing). In each of these blocks, a timing slack report may be generated. While the thermal map and IR loss map may also be generated, consideration of the timing slack report may be prioritized to ensure performance is met.

Note that while the above discussion contemplates invoking the conversion loop twice (i.e., pre-routing and post-routing), the present disclosure is not so limited, and the conversion loop may be invoked multiple times. For example, in some industry standard place and route tools, there may be multiple passes of routing to allow for multiple permutations of routing and placement candidates to be evaluated until internal metrics within the tool for an optimum design are satisfied. The conversion loop may be invoked once or twice for each one of the multiple passes.

At the end of the process 500, an IC having a hybrid grid and pillar PDN should be designed. The pillars are positioned in regions that need low IR drops, and the grids extend from at least a first region having a first characteristic that impacts or is impacted by a local junction temperature to a second region having a different characteristic so as to help dissipate heat, reduce noise by providing decoupling, and still provide relatively low IR drops. As noted above, exemplary characteristics include current density, timing slack, and switching frequency.

In summary, a cell library (e.g., the cell library 512B) containing optimal power candidate locations is coupled with software that addresses issues associated with inefficiencies of pure pillar-based PDN design in ICs as well as the inefficiencies of a pure grid-based PDN design in ICs. By hybridizing the two approaches, a synergistic alleviation of those inefficiencies is provided. In particular, the process 500 addresses IR loss while ensuring minimum local junction heating and optimal noise decoupling. The pillar configurations may be used with partial and/or full grid-based structures that occur much lower in the metal layers than traditional pillar designs. The process 500 takes in consideration timing slack analysis and local thermal maps to ensure optimal timing performance, optimal electro-migration, and consideration for end-of-life issues for the IC. The cell library 512B may incorporate optimized locations for hybrid PDN attention when cells are used in high switching and/or have high drive applications or placements. The ability for the user to define thresholds or prioritization criteria provides enhanced user control over the power plane in the design phase.

The PDNs using hybrid grid and pillar arrangements according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 6:
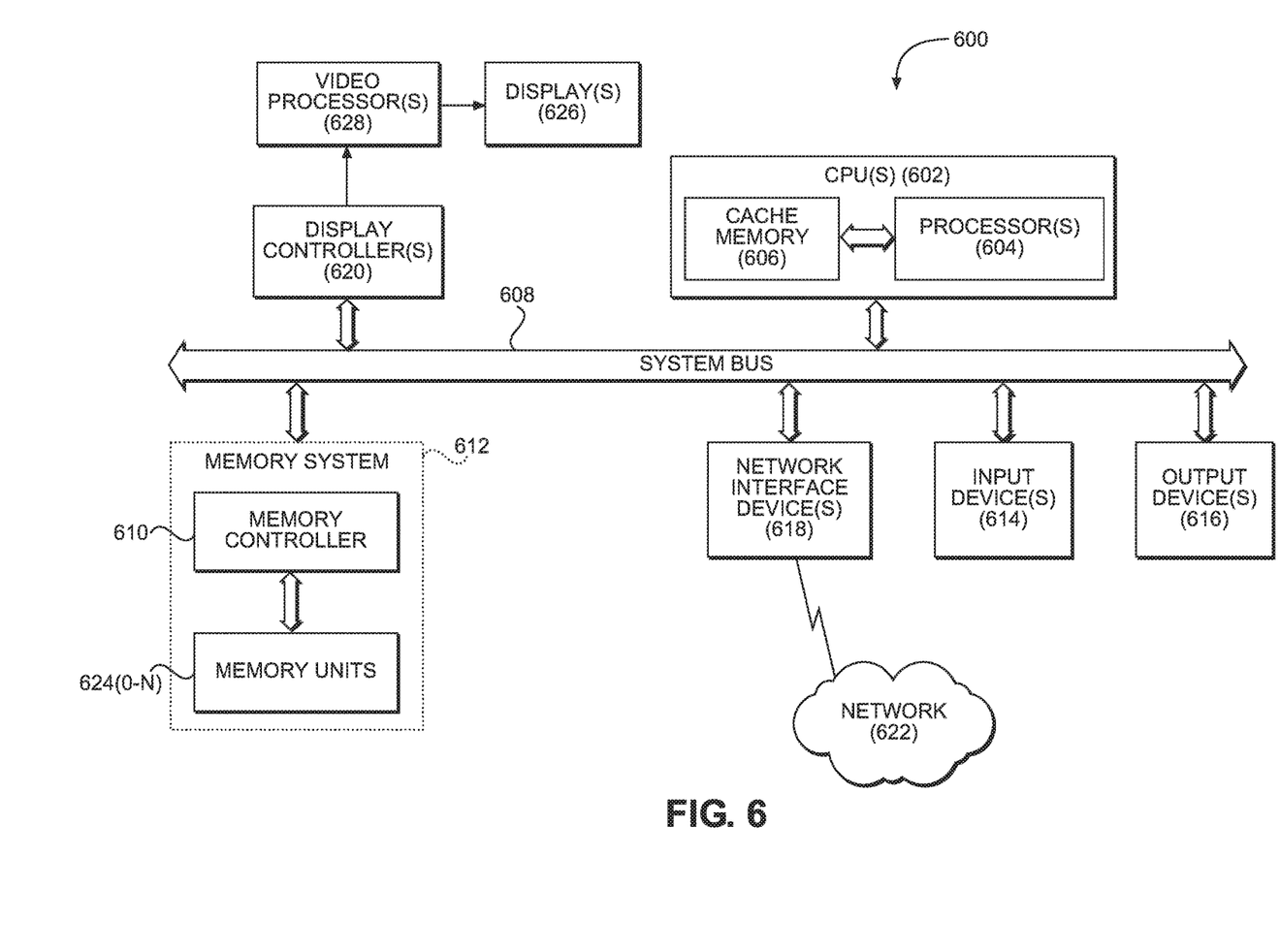
FIG. 6 is a block diagram of an exemplary processor-based system that can include ICs having the hybrid grid-pillar PDN designed according to the process of FIG. 5.

In this regard, FIG. 6 illustrates an example of a processor-based system 600 that can employ integrated circuits having power distribution networks (PDNs) using hybrid grid and pillar arrangements created through the process 500 of FIG. 5. In this example, the processor-based system 600 includes one or more central processing units (CPUs) 602, each including one or more processors 604. The CPU(s) 602 may have cache memory 606 coupled to the processor(s) 604 for rapid access to temporarily stored data. The CPU(s) 602 is coupled to a system bus 608 and can intercouple master and slave devices included in the processor-based system 600. As is well known, the CPU(s) 602 communicates with these other devices by exchanging address, control, and data information over the system bus 608. For example, the CPU(s) 602 can communicate bus transaction requests to a memory controller 610 as an example of a slave device. Although not illustrated in FIG. 6, multiple system buses 608 could be provided, wherein each system bus 608 constitutes a different fabric.

Other master and slave devices can be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including, but not limited to, input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include one or more memory units 624(0-N).

The CPU(s) 602 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An integrated circuit (IC), comprising:
a substrate having an active layer thereon, the active layer having a first region having a first characteristic impacting or impacted by a local thermal condition and a second region having a second characteristic;
a plurality of metal layers positioned above the active layer; and
a power distribution network (PDN), comprising:
a plurality of pillars extending through at least four metal layers positioned closest to the active layer; and
a grid formed from metal traces within the at least four metal layers positioned closest to the active layer, the grid interconnecting at least a subset of the plurality of pillars, wherein the grid extends from the first region into the second region.

2. The IC of claim 1, wherein the grid comprises a power rail and a ground rail.

3. The IC of claim 1, wherein the first region comprises a first current density.

4. The IC of claim 3, wherein the grid extends at least partially through the first region into the second region having a second current density lower than the first current density.

5. The IC of claim 1, wherein the first characteristic comprises a first switching frequency.

6. The IC of claim 5, wherein grid extends at least partially through the first region into the second region having a second switching frequency lower than the first switching frequency.

7. The IC of claim 1, wherein the first characteristic comprises a first timing slack.

8. The IC of claim 7, wherein the grid extends at least partially through the first region into the second region having a second timing slack different than the first timing slack.

9. The IC of claim 1, wherein the first characteristic comprises a first predicted localized junction temperature.

10. The IC of claim 9, wherein the grid extends at least partially through the first region into the second region having a second predicted localized junction temperature lower than the first predicted localized junction temperature.

11. The IC of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

12. A method to design an integrated circuit (IC), comprising:
analyzing an initial placement of active elements in an IC design where the initial placement includes an initial power distribution network (PDN) based on one or more initial criteria;
determining current densities for regions of the initial placement with the initial PDN;
ranking the regions based on the current densities and one or more additional criteria;
for a first region, identifying a neighbor region; and
inserting one or more grid structures in the initial PDN, where the one or more grid structures are positioned in a metal layer proximate an active layer within the first region and extending into the neighbor region to alleviate thermal activity in the first region.

13. The method of claim 12, further comprising:
creating an initial list of the active elements for the IC design;
performing the initial placement of the active elements using a first software tool; and
assigning an initial pillar-based PDN based on the initial placement.

14. The method of claim 12, further comprising coupling at least one pillar in the first region to the one or more grid structures.

15. The method of claim 12, further comprising performing a post-route analysis after inserting the one or more grid structures.

16. The method of claim 15, further comprising analyzing post-route regions for current levels after the post-route analysis.

17. The method of claim 16, further comprising ranking the post-route regions based on the current densities.

18. The method of claim 12, wherein analyzing the initial placement of the active elements in the IC design based on the one or more initial criteria comprises analyzing a timing slack report.

19. The method of claim 12, wherein analyzing the initial placement of the active elements in the IC design based on the one or more initial criteria comprises analyzing a thermal map.

20. The method of claim 12, wherein analyzing the initial placement of the active elements in the IC design based on the one or more initial criteria comprises analyzing a voltage drop (IR) loss map.

21. The method of claim 12, wherein identifying the neighbor region comprises identifying a neighbor region having a current density below a predefined threshold.

22. The method of claim 12, wherein identifying the neighbor region comprises identifying a neighbor region having a switching frequency below a predefined threshold.

23. The method of claim 12, wherein ranking the regions based on the current densities and the one or more additional criteria comprises considering an end-of-life criterion.

24. The method of claim 12, wherein ranking the regions based on the current densities and the one or more additional criteria comprises consulting a cell library for additional information about the regions.

25. The method of claim 12, further comprising iterating through ranked regions and inserting the one or more grid structures in a plurality of the ranked regions.

26. A non-transitory computer-readable medium having stored thereon computer executable instructions which, when executed by a processor, cause the processor to:

analyze an initial placement of active elements in an IC design where the initial placement includes an initial power distribution network (PDN) based on one or more initial criteria;

determine current densities for regions of the initial placement with the initial PDN;

rank the regions based on the current densities and one or more additional criteria;

for a first region, identify a neighbor region; and insert one or more grid structures in the initial PDN, where the one or more grid structures are positioned in a metal layer proximate an active layer within the first region and extending into the neighbor region to alleviate thermal activity in the first region.

27. A method to design an integrated circuit (IC), comprising:

analyzing, based on one or more initial thermally-based criteria, an initial placement of active elements in an IC design where the initial placement includes an initial power distribution network (PDN);

determining current densities for regions of the initial placement with the initial PDN;

inserting one or more grid structures in the initial PDN, where the one or more grid structures are positioned in a metal layer within an initial four metal layers closest to an active layer.

* * * * *